United States Patent
Evans et al.

(10) Patent No.: US 8,695,557 B2
(45) Date of Patent: Apr. 15, 2014

(54) SELF-LUBRICATING BALANCE SHAFT WITH FLOW CONTROL

(71) Applicant: Schaeffler Technologies AG & Co. KG, Herzogenaurach (DE)

(72) Inventors: Matthew Evans, Warren, MI (US); Matthew Erker, Clarkston, MI (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 13/673,073

(22) Filed: Nov. 9, 2012

(65) Prior Publication Data

US 2013/0167792 A1  Jul. 4, 2013

Related U.S. Application Data

(60) Provisional application No. 61/582,952, filed on Jan. 4, 2012.

(51) Int. Cl.
*F02B 75/08* (2006.01)

(52) U.S. Cl.
USPC ............... 123/192.2; 74/44; 74/603; 74/604

(58) Field of Classification Search
USPC ..................... 123/192.2; 74/44, 603–604
See application file for complete search history.

(56) References Cited

U.S. PATENT DOCUMENTS

| | | | | |
|---|---|---|---|---|
| 3,355,108 | A * | 11/1967 | Cummins, Jr. | 239/90 |
| 4,273,003 | A * | 6/1981 | Schultz | 74/467 |
| 5,235,547 | A * | 8/1993 | Kobayashi | 365/190 |
| 5,253,547 | A * | 10/1993 | Yoneyama et al. | 74/604 |
| 5,398,406 | A * | 3/1995 | Wilcox, II | 29/888.011 |
| 6,305,339 | B1 | 10/2001 | Iwata et al. | |
| 6,732,600 | B2 * | 5/2004 | Greubel | 74/89.44 |
| 6,971,361 | B2 | 12/2005 | Lawrence | |
| 7,044,643 | B2 * | 5/2006 | Greubel | 384/475 |
| 7,431,510 | B2 * | 10/2008 | Schott | 384/462 |
| 8,387,584 | B2 * | 3/2013 | Solfrank | 123/192.2 |
| 2008/0053753 | A1 | 3/2008 | Chevalier et al. | |
| 2011/0023809 | A1 * | 2/2011 | Solfrank | 123/192.2 |
| 2012/0304957 | A1 * | 12/2012 | Watanabe | 123/196 R |

* cited by examiner

*Primary Examiner* — Marguerite McMahon
*Assistant Examiner* — James Kim
(74) *Attorney, Agent, or Firm* — Volpe and Koenig, P.C.

(57) ABSTRACT

A mass compensating shaft drive for compensating forces or moments of inertia of a reciprocating piston internal combustion engine is provided having a balance shaft supported by at least one journal in a housing of the internal combustion engine. A rolling bearing is located between each of the at least one journals and the housing. The balance shaft includes an oil gallery that is adapted to be connected to a source of pressurized lubricating oil. A check valve is located between the oil gallery and each of the at least one bearing journals, with the check valve being arranged to open upon at least one of a lubricating oil pressure or a centrifugal force generated through rotation of the balance shaft exceeding a predetermined closing force for the check valve.

11 Claims, 2 Drawing Sheets

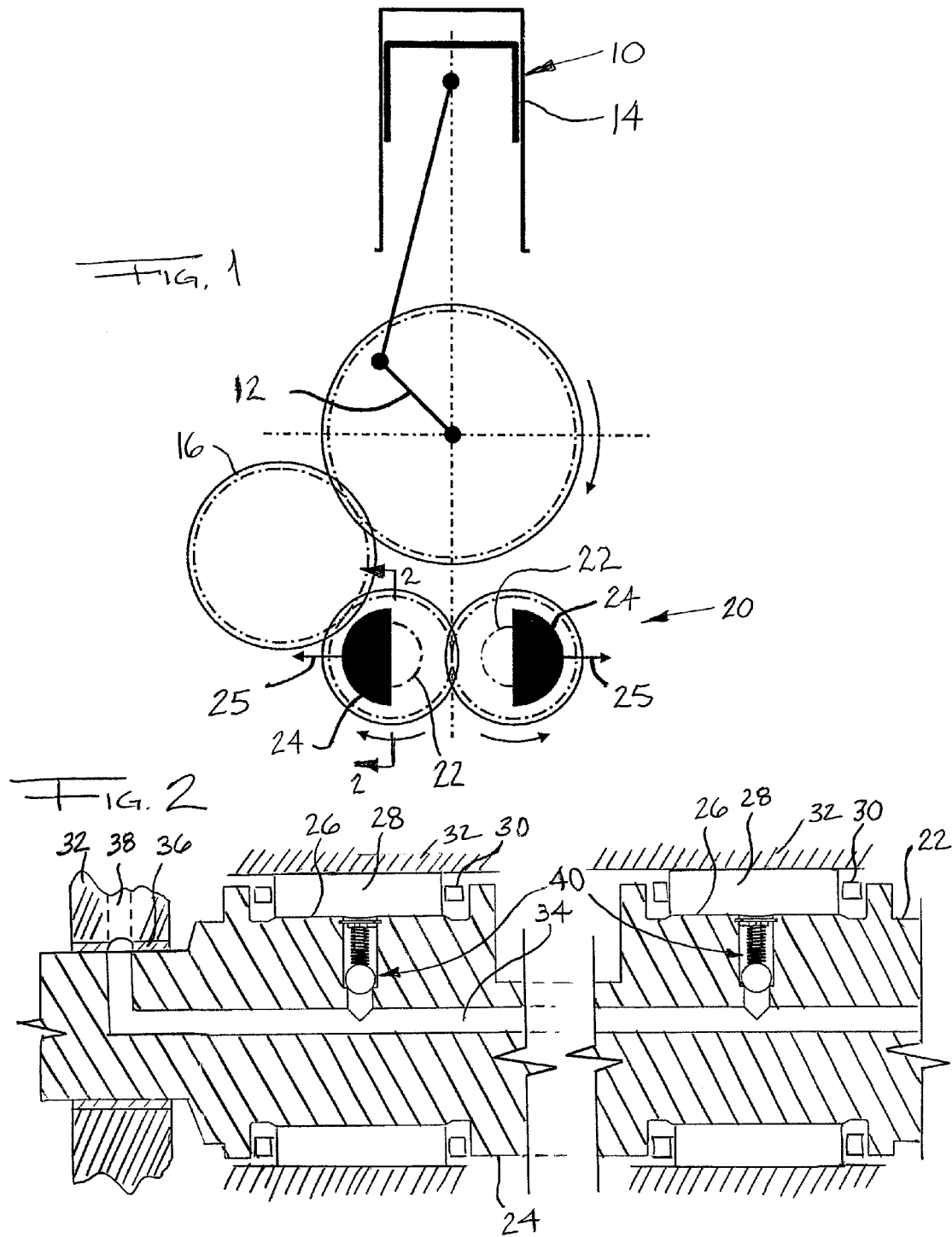

SELF-LUBRICATING BALANCE SHAFT WITH FLOW CONTROL

INCORPORATION BY REFERENCE

The following documents are incorporated herein by reference as if fully set forth: U.S. Provisional Application No. 61/582,952, filed Jan. 4, 2012.

FIELD OF INVENTION

The present invention relates to a mass compensating system drive for use in an internal combustion engine which includes balance shafts with journals supported by rolling bearings and an improved lubrication system for such balance shaft bearings.

BACKGROUND

Mass compensating system drives are known which include at least one balance shaft, generally two, for compensating forces and/or moments of inertia of a reciprocating piston internal combustion engine. The balance shaft rotates within a housing of two to three journals that contain either plain or rolling bearings. The bearings are typically lubricated by pressurized splash or mist oil.

U.S. Pat. No. 6,305,339 discloses a balance shaft for a mass compensating system drive for an internal combustion engines. The balance shaft has unbalanced masses arranged on both sides of a journal, while the journal projects significantly in the radial direction past the shaft sections adjacent to the journal within a part of the periphery that is diametrically opposite the unbalanced masses.

U.S. Pat. No. 6,971,361 discloses a balance shaft mounted via rolling bearings on its journals. Lubrication here also appears to be provided by a mist of lubricating oil in the associated area of the engine block or housing.

US 2008/0053753 discloses a balance shaft module using plain bearings to support the balance shafts. The bearings are lubricated by the engine oil system which provides a flow of lubricating oil to the bearing journal. However, no regulation of the oil flow is provided.

It would be desirable to provide a flow of lubricating oil to the journals of a balance shaft of a mass compensating system drive that can be regulated depending on conditions, such as engine speed, in order to ensure proper lubrication for long life.

SUMMARY

A mass compensating shaft drive for compensating forces or moments of inertia of a reciprocating piston internal combustion engine is provided having a balance shaft supported by at least one journal in a housing of the internal combustion engine. Preferably, two counter-rotating balance shafts are provided. A rolling bearing is located between each of the at least one journals and the housing. The balance shaft includes an oil gallery that is adapted to be connected to a source of pressurized lubricating oil of the internal combustion engine. A check valve is located between the oil gallery and each of the at least one bearing journals, with the check valve being arranged to open upon at least one of a lubricating oil pressure or a centrifugal force generated through rotation of the balance shaft exceeding a predetermined closing force for the check valve.

In one arrangement of the invention, the check valve includes a spring that biases a valve body to a closed position in a direction toward a center axis of the balance shaft.

Here, the opening force required for moving the valve body away from the closed position is created by a combination of the centrifugal force of the valve body based on a rotational speed of the balance shaft and the oil pressure acting on the valve body, which, according to the invention, allows a spring constant of the spring to be set so that the check valve opens or opens to a greater extent once a predetermined rotational speed is exceeded. In addition or alternatively, the mass of the valve body could also be adjusted, for example by selecting a valve body having a different mass.

A balance shaft for a mass compensating shaft drive is also provided that is adapted to be supported by at least one journal in a housing of an internal combustion engine. The balance shaft has at least one bearing journal and an oil gallery is defined in the balance shaft that is adapted to be connected to a source of pressurized lubricating oil of the internal combustion engine. A check valve is located between the oil gallery and each of the at least one bearing journals, with the check valve being arranged to open upon at least one of a lubricating oil pressure or a centrifugal force generated through rotation of the balance shaft exceeding a predetermined closing force for the check valve.

Other aspects of the invention are described below and in the claims, and have not been repeated here.

BRIEF DESCRIPTION OF THE DRAWINGS

The foregoing Summary and the following detailed description will be better understood when read in conjunction with the appended drawings, which illustrate a preferred embodiment of the invention. In the drawings:

FIG. 1 is a schematic view of an internal combustion engine with a mass compensating shaft drive according to the invention.

FIG. 2 is a cross-sectional view taken along line 2-2 in FIG. 1 showing a balance shaft of the mass compensating shaft drive.

DETAILED DESCRIPTION OF THE PREFERRED EMBODIMENTS

Figure 3:
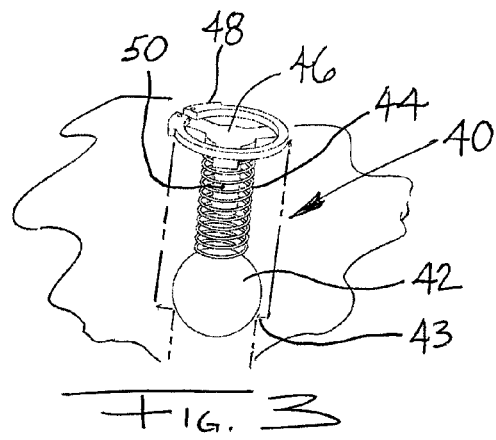
FIG. 3 is an enlarged isometric view of a portion of the balance shaft, partially broken away to show a check valve located in the balance shaft.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Referring now to FIG. 1, an internal combustion engine 10 is schematically illustrated which includes the mass compensating drive system 20 according to the invention. The internal combustion engine 10 includes a crankshaft 12 that is connected to pistons 14 in order to drive the crankshaft 12. In order to reduce vibrations caused by forces and moments of inertia within the internal combustion engine, the mass compensating drive system 20 is connected to the crankshaft drive via an intermediate gear 16 or any other suitable drive. Typically, mass compensating drive systems include one or two counter rotating balance shafts 22, each having an offset mass 24 that is used to compensate for the forces or moments of inertia of the moving parts of the internal combustion engine in order to reduce and/or damp vibrations. The offset masses 24 generate an outwardly directed force, indicated by arrows 25 due to the centrifugal force created via rotation of the balance shafts 22.

Referring now to FIG. 2, one balance shaft 22 is shown in detail. The balance shaft 22 is supported by at least one bearing journal 26 in a housing or block 32 of the internal combustion engine 10. In the preferred embodiment, the balance shafts 22 are each supported via two bearing journals 26 in the housing 32 via rolling bearings 28, preferably in the form of needle bearings that have rollers or needles held in place via bearing cages 30. The rollers or needles preferably contact the bearing journals 26 which form the inner bearing races directly on the inner side and may be supported on their radially outward sides by an outer race (not shown) or the housing 32 that supports the balance shafts 22.

An oil gallery 34 extends axially through each of the balance shafts 22, preferably along a center axis. The oil gallery 34 is adapted to be connected to a source of pressurized lubricating oil of the internal combustion engine 10, preferably via a plain bearing 36 located at another position along the balance shaft 22 which is connected to an oil feed line 38 of the pressurized lubricating oil system of the internal combustion engine 10.

Referring to FIGS. 2 and 3, a check valve 40 is located between the oil gallery 34 and each of the bearing journals 26 of the balance shaft 21. The check valve 40 is arranged to open upon at least one of the lubricating oil pressure or a combination of the lubricating oil pressure and centrifugal force generated through rotation of the balance shaft 22 exceeding a pre-determined closing force for the check valve 40. The amount that the check valve 40 opens preferably increases as the centrifugal force increases so that a greater flow of lubricating oil is provided at higher balance shaft rpm's.

In the preferred embodiment, as shown in FIG. 3, the check valve includes a valve body 42 that is biased via a spring 44 to a closed position against a valve seat 43 formed in the balance shaft 22, with the closing direction of the valve body 42 being inward in a direction toward a center axis of the balance shaft 22. Optionally, the valve seat 43 can include one or more small grooves to always allow a metered flow of lubricating oil during engine operation even when the check valve 40 is closed. The spring 44 is held in position on a side opposite the valve body 42 by a spring support 46. The spring support 46 can be in the form of a spider with multiple arms having spaces defined therebetween as oil flow paths as shown in FIG. 3. Alternatively, the spring support 46' shown in FIG. 4 can be utilized which is in the form of a disc having a plurality of apertures that define an oil flow path through the spring support 46'. Preferably, a spring-type retainer clip 48 holds the spring support 46 in position, as shown in FIG. 3. A further embodiment of the spring support 46" is shown in FIG. 6, which is similar to the embodiment shown in FIG. 4.

Figure 4:
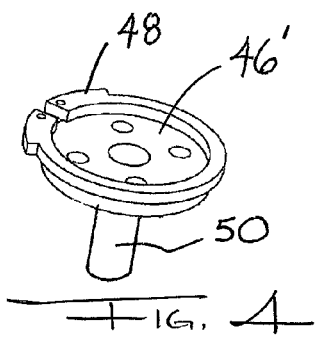
FIG. 4 is a perspective view of an alternate embodiment of a spring support used in connection with the check valve shown in FIG. 3.
Figure 6:
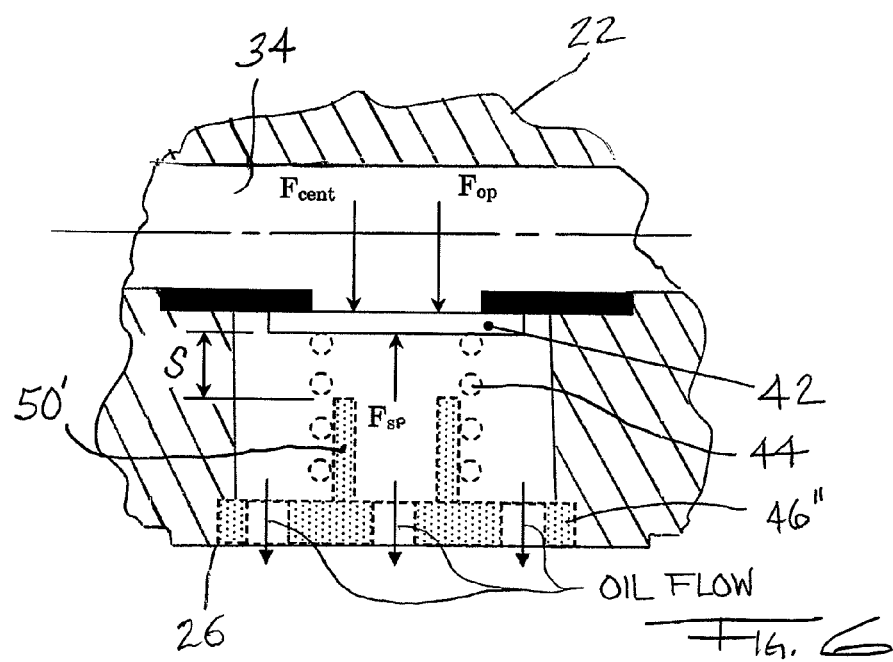
FIG. 6 is a cross-sectional view of a portion of a balance shaft in which an alternate check valve arrangement of the invention is shown.

As shown in FIGS. 3, 4, and 6, preferably the spring supports 46, 46' include a stroke limiter 50 that extends toward the valve body 42 and defines a maximum travel distance from the closed position of the valve body 42 to a maximum open position. The stroke limiter 50 can be a solid bar that extends from the spring support 46, 46'. As an alternative, a hollow tube is shown as forming the stroke limiter 50' shown in FIG. 6. The stroke limiter limits the valve body to a maximum opening travel path S, as shown in FIG. 6.

Figure 5:
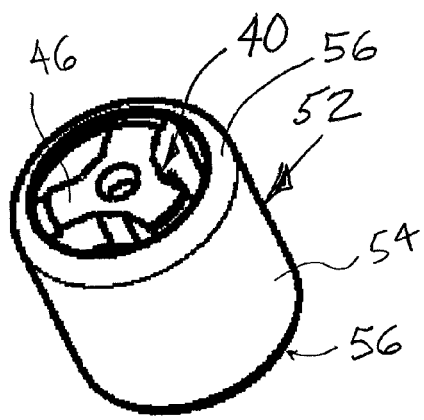
FIG. 5 is an alternate embodiment of the check valve shown in FIG. 3 in which the check valve is a pre-assembled check valve cartridge.

Referring now to FIG. 5, as an alternative, it is possible to provide the check valve 40 as a pre-assembled check valve cartridge 52 by positioning the valve body 42, the spring 44 and the spring support 46 within a hollow outer body 54. The outer body 54 includes a radially inwardly directed flange 56 at each end which, on the one end forms the valve seat 43 and on the other end acts as the retainer for the spring support 46. With this arrangement, the check valve 40 can be pre-assembled as the check valve cartridge 52 which is then press fit into an opening in the mass balance shaft 22 at each journal 26.

Preferably, the check valves 40 are located in the bearing journals 26 on a side opposite the offset mass 24, so that they are in a non-loaded or minimally loaded portion of the bearing journal 26. This prevents damage to the rollers or needles of the bearings 28 as they travel over the check valve opening.

In use, in order to open the check valve 40 to provide for enhanced lubrication, which can be in addition to the oil mist lubrication known in the prior art, an opening force is required for moving the valve body 42 away from the closed position. This opening force is created by the oil pressure force or a combination of oil pressure force and the centrifugal force of the valve body based on a rotational speed of the balance shaft. The centrifugal force can be expressed as $F_{cent}=m\omega^2 r$, where $F_{cent}$=centrifugal force, m=the mass of the check valve body 42, $\omega$=the rotational speed of the balance shaft, and r is the distance of the check valve body 42 from the rotational axis of the balance shaft 22. The oil pressure acting on the valve body can be expressed as follows: $f_{op}=PA$, where $f_{op}$ is the force that is applied, P is the oil pressure and A is the area of the valve body 42 upon which the oil pressure acts. The oil pressure force acting alone or in combination with the centrifugal force opens the check valve 40 by overcoming the spring force $F_{sp}$, which can be expressed as: $F_{sp}=kX$, where k is the spring constant and X is the displacement. Depending upon the forces acting on the valve body 42, the oil flow can be regulated from a small flow to a greater flow with increasing centrifugal force based on the increased rpms of the balance shaft 22 providing a higher force that results in further compression of the spring to provide a larger through flow path for the oil. The stroke limiter 50 limits the stroke S of the valve body 42 to a pre-determined maximum. By adjusting the spring constant of the spring 44 and/or the mass of the valve body 42 and/or the distance r, the amount that the check valve 40 opens can be set to provide a desired oil flow based upon the rotational speed of the balance shaft 22. Thus, at higher speeds, increased oil flow can be provided in order to provide more lubricant to the bearings 28 and the bearing journals 26. This is critical for balance shafts where loads can be in the range of 5,000-7,000N at speeds in the range of 10,000-14,000 rpm. Adequate lubrication at these speeds and loads is critical to maintaining product life and cannot be guaranteed by the prior known splash or mist lubrication systems. Further, by allowing the check valve opening force to be tuned to the specific operating circumstances, this allows extra lubrication to be provided within certain duty cycles of the internal combustion engine 10.

The forces acting on the check valve 40 are shown in detail in FIG. 6 which is a partially schematic diagram of the balance shaft 22 in the area of a check valve 40. In FIG. 6, the spring support 46' is shown having a hollow stroke limiter 50' and a plurality of openings that allow for oil flow.

Having thus described the present invention in detail, it will be appreciated and apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A mass compensating shaft drive for compensating forces or moments of inertia of a reciprocating piston internal combustion engine, comprising:
   a balance shaft supported by at least one journal in a housing of the internal combustion engine;
   a rolling bearing located between each of the at least one journals and the housing;
   the balance shaft including an oil gallery that is adapted to be connected to a source of pressurized lubricating oil of the internal combustion engine; and
   a check valve located between the oil gallery and each of the at least one bearing journals, the check valve being arranged to open upon at least one of a lubricating oil pressure or a centrifugal force generated through rotation of the balance shaft exceeding a predetermined closing force for the check valve, and the check valve includes a spring that biases a valve body to a closed position in a direction toward a center axis of the balance shaft.

2. The mass compensating shaft drive of claim 1, wherein an opening force required for moving the valve body away from the closed position is created by a combination of the centrifugal force of the valve body based on a rotational speed of the balance shaft and an oil pressure acting on the valve body, and at least one of a spring constant of the spring, a mass of the valve body, or a distance r of the valve body from a rotational axis of the balance shaft is set so that the check valve opens or opens to a greater extent upon a predetermined rotational speed being exceeded.

3. The mass compensating shaft drive of claim 1, wherein the spring is held in position on a side opposite the valve body by a spring support having an oil flow path defined therethrough.

4. The mass compensating shaft drive of claim 2, wherein the spring support includes a stroke limiter that extends toward the valve body and defines a maximum travel distance from the closed position of the valve body to a maximum open position.

5. The mass compensating shaft drive of claim 1, wherein the check valve comprises a pre-assembled cartridge including an outer body which houses a spring biased valve body, and the pre-assembled cartridge is press fit into the balance shaft.

6. The mass compensating shaft drive of claim 1, wherein two of the balance shafts are provided, each of the balance shafts includes at least one check valve located in the respective at least one bearing journal of the respective balance shaft.

7. A balance shaft for a mass compensating shaft drive that is adapted to be supported in a housing of an internal combustion engine, the balance shaft comprising:
   at least one bearing journal;
   an oil gallery defined in the balance shaft that is adapted to be connected to a source of pressurized lubricating oil of the internal combustion engine; and
   a check valve located between the oil gallery and each of the at least one bearing journals, the check valve being arranged to open upon at least one of a lubricating oil pressure or a centrifugal force generated through rotation of the balance shaft exceeding a predetermined closing force for the check valve, and the check valve includes a spring that biases a valve body to a closed position in a direction toward a center axis of the balance shaft.

8. The balance shaft of claim 7, wherein an opening force required for moving the valve body away from the closed position is created by a combination of the centrifugal force of the valve body based on a rotational speed of the balance shaft and an oil pressure acting on the valve body, and at least one of a spring constant of the spring, a mass of the valve body, or a distance r of the valve body from a rotational axis of the balance shaft is set so that the check valve opens or opens to a greater extent upon a predetermined rotational speed being exceeded.

9. The mass compensating shaft drive of claim 7, wherein the spring is held in position on a side opposite the valve body by a spring support having an oil flow path defined therethrough.

10. The mass compensating shaft drive of claim 9, wherein the spring support includes a stroke limiter that extends toward the valve body and defines a maximum travel distance from the closed position of the valve body to a maximum open position.

11. The mass compensating shaft drive of claim 7, wherein the check valve comprises a pre-assembled cartridge including an outer body which houses a spring biased valve body, and the pre-assembled cartridge is press fit into the balance shaft.

* * * * *